(12) United States Patent
Sundararajan et al.

(10) Patent No.: US 11,306,639 B2
(45) Date of Patent: Apr. 19, 2022

(54) SYSTEMS AND METHODS FOR INCREASING REDUCTANT INSERTION ACCURACY

(71) Applicant: Cummins Emission Solutions Inc., Columbus, IN (US)

(72) Inventors: Vikram Sundararajan, Columbus, IN (US); Joe V. Hill, Columbus, IN (US); Stephen M. Holl, Columbus, IN (US); Masoud Ziabakhsh Deilami, Columbus, IN (US)

(73) Assignee: Cummins Emission Solutions Inc, Columbus, IN (US)

( * ) Notice: Subject to any disclaimer, the term of this patent is extended or adjusted under 35 U.S.C. 154(b) by 0 days.

(21) Appl. No.: 17/263,236

(22) PCT Filed: Aug. 7, 2018

(86) PCT No.: PCT/US2018/045624
§ 371 (c)(1),
(2) Date: Jan. 26, 2021

(87) PCT Pub. No.: WO2020/032933
PCT Pub. Date: Feb. 13, 2020

(65) Prior Publication Data
US 2021/0148268 A1 May 20, 2021

(51) Int. Cl.
*F01N 3/20* (2006.01)
*F01N 11/00* (2006.01)

(52) U.S. Cl.
CPC ............. *F01N 3/208* (2013.01); *F01N 11/00* (2013.01); *F01N 2550/05* (2013.01);
(Continued)

(58) Field of Classification Search
CPC .. F01N 3/208; F01N 11/00; F01N 2900/0412; F01N 2610/02; F01N 2550/05;
(Continued)

(56) References Cited

U.S. PATENT DOCUMENTS 8,376,929 B2 2/2013 Birk et al.
2010/0292941 A1* 11/2010 Grasso ............... G01L 19/0092
702/50
(Continued)

OTHER PUBLICATIONS

Ahmed Elfeky, "Methods of calibration for different functions of a SCR-system" (dated Mar. 27, 2018).
(Continued)

*Primary Examiner* — Brandon D Lee
(74) *Attorney, Agent, or Firm* — Foley & Lardner LLP

(57) ABSTRACT

An aftertreatment system comprises a SCR system, a reductant injector operatively coupled to the SCR system, and a reductant insertion assembly operatively coupled to the reductant injector. The reductant insertion assembly comprises a pump configured to pump the reductant through the reductant injector. A controller is operatively coupled to the reductant insertion assembly and configured to receive predetermined calibration values of the pump corresponding to delivery of a reductant by the pump through a calibration injector. The controller determines a desired flow rate value of the reductant into the SCR system. The controller determines an insertion time of the reductant injector for delivering the reductant through the reductant injector based on the desired flow rate value, a pump operating parameter value of the pump and the predetermined calibration values, and activates the reductant injector for the insertion time.

22 Claims, 5 Drawing Sheets

(52) U.S. Cl.
CPC .... *F01N 2610/02* (2013.01); *F01N 2610/144* (2013.01); *F01N 2610/146* (2013.01); *F01N 2900/0412* (2013.01); *F01N 2900/1808* (2013.01); *F01N 2900/1812* (2013.01); *F01N 2900/1821* (2013.01); *F01N 2900/1822* (2013.01)

(58) Field of Classification Search
CPC ......... F01N 2610/144; F01N 2610/146; F01N 2900/1808; F01N 2900/1812; F01N 2900/1821; F01N 2900/1822; F01N 9/00; Y02T 10/40; Y02T 10/12
See application file for complete search history.

(56) References Cited

U.S. PATENT DOCUMENTS

| | | | |
|---|---|---|---|
| 2012/0067031 A1* | 3/2012 | Wang | F01N 3/208 60/277 |
| 2016/0010529 A1* | 1/2016 | Wang | F01N 3/208 60/274 |
| 2016/0108785 A1 | 4/2016 | Bruck et al. | |
| 2016/0131004 A1* | 5/2016 | Hodgson | F01N 3/208 60/299 |
| 2016/0376965 A1 | 12/2016 | Mittal et al. | |
| 2017/0284265 A1 | 10/2017 | Zhang | |

OTHER PUBLICATIONS

International Search Report and Written Opinion issued for PCT/US2018/045624, dated Nov. 19, 2018, 11 pages.

\* cited by examiner

SYSTEMS AND METHODS FOR INCREASING REDUCTANT INSERTION ACCURACY

CROSS-REFERENCE TO RELATED APPLICATIONS

The present application is a National Phase Application of PCT/US2018/045624, filed Aug. 7, 2018, the contents of which are hereby incorporated by reference in their entirety.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems comprise any of several different components to reduce the levels of harmful exhaust emissions present in exhaust gas. For example, certain exhaust gas aftertreatment systems for diesel-powered IC engines comprise a selective catalytic reduction (SCR) system, including a catalyst formulated to convert NOx (NO and $NO_2$ in some fraction) into harmless nitrogen gas ($N_2$) and water vapor ($H_2O$) in the presence of ammonia ($NH_3$). Generally in such aftertreatment systems, an exhaust reductant (e.g., a diesel exhaust fluid such as urea) is injected into the SCR system to provide a source of ammonia and mixed with the exhaust gas to partially reduce the NOx gases. The reduction byproducts of the exhaust gas are then fluidically communicated to the catalyst included in the SCR system to decompose substantially all of the NOx gases into relatively harmless byproducts that are expelled out of the aftertreatment system.

In order to obtain optimal reduction of NOx gases in the exhaust gas, the reductant should be inserted with high accuracy (e.g., within ±1% of a desired reductant amount or flow rate) into the SCR system. However, part to part variations between pumps included in a reductant insertion assembly and a reductant injector operatively coupled to the reductant insertion assembly can cause significant variations in the amount of flow rate of the reductant inserted into the SCR system.

SUMMARY

Embodiments described herein relate generally to systems and methods for increasing insertion accuracy of a reductant into a SCR system, and in particular, to systems and methods for calibrating a pump with a calibration injector so as to determine calibration values of the pump. The reductant is delivered at a desired flow rate by the pump coupled with any injector by adjusting an insertion time of the reductant injector based on a pump operating parameter value and the predetermined calibration values.

In a first set of embodiments, an aftertreatment system comprises a SCR system and a reductant injector operatively coupled to the SCR system. A reductant insertion assembly is operatively coupled to the reductant injector. The reductant insertion assembly comprises a pump configured to pump the reductant through the reductant injector. A controller is operatively coupled to the reductant insertion assembly. The controller is configured to receive predetermined calibration values of the pump corresponding to delivery of a reductant by the pump through a calibration injector. The controller is configured to determine a desired flow rate of the reductant into the SCR system. The controller is configured to determine an insertion time of the reductant injector for delivering the reductant through the reductant injector based on the desired flow rate value, a pump operating parameter value of the pump and the predetermined calibration values. Furthermore, the controller is configured to activate the reductant injector for the insertion time.

In another set of embodiments, a method for delivering a reductant into a SCR system via a reductant injector using a reductant insertion assembly comprising a pump and a pressure sensor comprises receiving predetermined calibration values of the pump corresponding to delivery of a reductant by the pump through a calibration injector. A desired flow rate of the reductant into the SCR system is determined. An insertion time of the reductant injector for delivering the reductant through the reductant injector is determined based on the desired flow rate value, a pump operating parameter value of the pump and the predetermined calibration values. The method also comprises activating the reductant injector for the insertion time.

In yet another set of embodiments, a control circuitry for controlling a flow rate of a reductant into an aftertreatment system via a reductant injector comprises a controller comprising a memory, a processor and a communication interface. The controller is configured to be operatively coupled to a reductant insertion assembly comprising a pump. The controller is configured to receive predetermined calibration values of the pump from the pump corresponding to delivery of a reductant by the pump through a calibration injector. The controller is configured to determine a desired flow rate of the reductant into the SCR system. The controller is configured determine an insertion time of the reductant injector for delivering the reductant through the reductant injector based on the desired flow rate value, a pump operating parameter value of the pump and the predetermined calibration values. Furthermore, the controller is configured to activate the reductant injector for the insertion time.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1A:
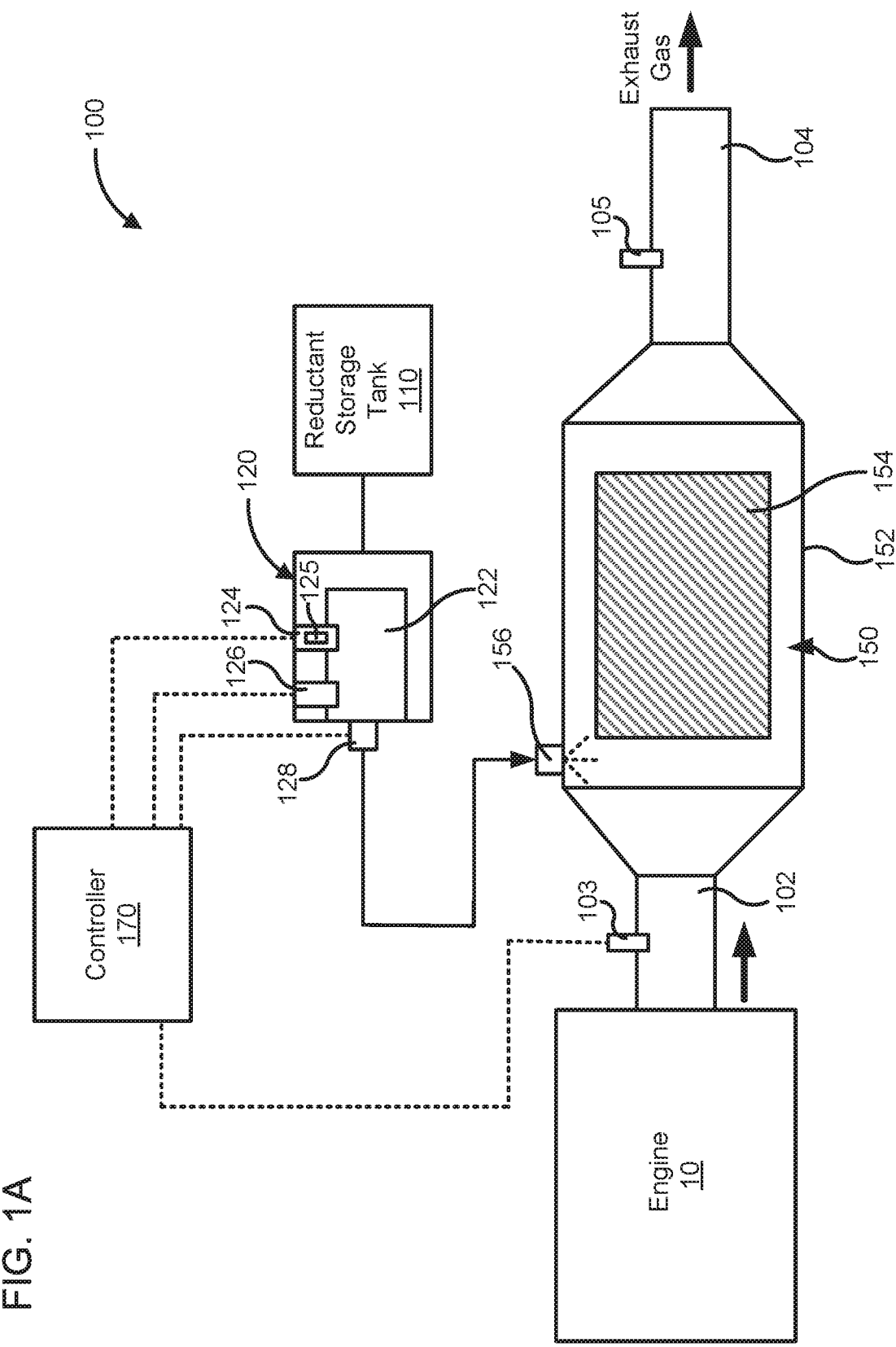
FIG. 1A is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for increasing insertion accuracy of a reductant into a SCR system via a reductant injector, and in particular, to systems and methods for calibrating a pump with a calibration injector so as to determine calibration values of the pump. The reductant is delivered at a desired flow rate by the pump coupled with any injector by adjusting an insertion time of the reductant injector based on a pump operating parameter value and the predetermined calibration values.

In order to obtain optimal reduction of NOx gases in the exhaust gas, the reductant should be inserted with high accuracy (e.g., within ±1% of a desired reductant amount or flow rate) into the SCR system. However, part to part variations between pumps included in a reductant insertion assembly as well as a reductant injector operatively coupled to the reductant insertion assembly can cause significant variations (e.g., greater than ±5%) in the amount of flow rate of the reductant inserted into the SCR system.

Expanding further, the reductant may be inserted at a desired flow rate into the aftertreatment system using a positive displacement pump having a high flow rate accuracy as a metering unit for obtaining high reductant flow rate accuracy across different operating conditions. A shortcoming of such an approach is a part to part variation among pumps even though a flow rate accuracy of any given pump may be highly reliable. Furthermore, a reductant injector used to insert the reductant into the aftertreatment system may also have part to part variations in a flow rate thereof. During operation of the reductant insertion assembly with a particular reductant injector, the difference or variation in the reductant injector flow rate (e.g., due to variations in a nozzle of the reductant injector) relative to the flow rate of the pump may cause an actual flow rate value of the reductant through the reductant injector to be different from the desired reductant flow rate value, causing inaccuracies in reductant insertion.

Various embodiments of the systems and methods described herein provide benefits including, for example: (1) providing highly accurate flow rate (e.g., within ±1% of a desired flow rate) of a reductant into a SCR system regardless of a pump of a reductant insertion assembly, and reductant injector combination used to deliver the reductant into the SCR system; (2) providing accurate flow rate without having to tune the pump and the reductant injector in implementations in which variation in either of them is unknown; and (3) eliminating the need to control part to part variation in the pump and the reductant injector to a tight tolerance as is the case with conventional reductant insertion assemblies, thereby reducing manufacturing and maintenance costs.

FIG. 1A is a schematic illustration of an aftertreatment system 100, according to an embodiment. The aftertreatment system 100 is configured to receive an exhaust gas from an engine 10 (e.g., a diesel engine, a gasoline engine, a natural gas engine, a dual fuel engine, a biodiesel engine, an E-85 engine, or any other suitable engine) and reduce constituents of the exhaust gas such as, for example, NOx gases, CO, hydrocarbons, etc. The aftertreatment system 100 may comprise a reductant storage tank 110, a reductant insertion assembly 120, an SCR system 150, and a controller 170.

The SCR system 150 comprises a housing 152 defining an internal volume within which at least one catalyst 154 formulated to decompose constituents of an exhaust flowing therethrough is positioned. The housing 152 may be formed from a rigid, heat-resistant and corrosion-resistant material, for example stainless steel, iron, aluminum, metals, ceramics, or any other suitable material. The housing 152 may have any suitable cross-section, for example circular, square, rectangular, oval, elliptical, polygonal, or any other suitable shape.

In some embodiments, the SCR system 150 may comprise a selective catalytic reduction filter (SCRF) system, or any other aftertreatment component configured to decompose constituents of the exhaust gas (e.g., NOx gases such as such nitrous oxide, nitric oxide, nitrogen dioxide, etc.), flowing through the aftertreatment system 100 in the presence of a reductant, as described herein.

Although FIG. 1A, shows only the catalyst 154 positioned within the internal volume defined by the housing 152, in other embodiments, a plurality of aftertreatment components may be positioned within the internal volume defined by the housing 152 in addition to the catalyst 154. Such aftertreatment components may comprise, for example, filters (e.g., particulate matter filters, catalyzed filters, etc.), oxidation catalysts (e.g., carbon monoxide, hydrocarbons and/or ammonia oxidation catalysts), mixers, baffle plates, or any other suitable aftertreatment component.

The catalyst 154 is formulated to selectively decompose constituents of the exhaust gas. Any suitable catalyst can be used such as, for example, platinum, palladium, rhodium, cerium, iron, manganese, copper, vanadium based catalyst, any other suitable catalyst, or a combination thereof. The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials may comprise, for example, aluminum oxide, titanium dioxide, silicon dioxide, any other suitable washcoat material, or a combination thereof. The exhaust gas (e.g., diesel exhaust gas) can flow over and/or about the catalyst 154 such that any NOx gases included in the exhaust gas are further reduced to yield an exhaust gas which is substantially free of NOx gases.

An inlet conduit 102 is operatively coupled to an inlet of the housing 152 and structured to receive exhaust gas from the engine 10 and communicate the exhaust gas to an internal volume defined by the housing 152. Furthermore, an outlet conduit 104 may be coupled to an outlet of the housing 152 and structured to expel treated exhaust gas into the environment. A first sensor 103 is positioned in the inlet conduit 102. The first sensor 103 may comprise a NOx sensor configured to measure an amount of NOx gases included in the exhaust gas flowing into the SCR system 150 and may include a physical NOx sensor or a virtual NOx sensor. In various embodiments, a temperature sensor, a pressure sensor, or any other sensor may also be positioned in the inlet conduit 102 so as to determine one or more operational parameters of the exhaust gas flowing through the aftertreatment system 100.

A second sensor 105 may be positioned in the outlet conduit 104. The second sensor 105 may comprise a second NOx sensor configured to determine an amount of NOx gases expelled into the environment after passing through the SCR system 150. In other embodiments, the second sensor 105 may comprise an ammonia sensor configured to measure an amount of ammonia in the exhaust gas flowing out of the SCR system 150, i.e., determine the ammonia slip. This may be used as a measure of determining a catalytic efficiency of the SCR system 150, adjust an amount of reductant to be inserted into the SCR system 150, and/or adjust a temperature of the SCR system 150 so as to allow the SCR system 150 to effectively use the ammonia for catalytic decomposition of the NOx gases included in the exhaust gas flowing therethrough. An ammonia oxide (AMOx) catalyst may be positioned downstream of the catalyst 154, for example, in the outlet conduit 104 so as to decompose any unreacted ammonia in the exhaust gas downstream of the SCR system 150.

A reductant port 156 may be positioned on a sidewall of housing 152 and structured to allow insertion of a reductant therethrough into the internal volume defined by the housing 152. The reductant port 156 may be positioned upstream of the catalyst 154 (e.g., to allow reductant to be inserted into the exhaust gas upstream of the catalyst 154) or over the catalyst 154 (e.g., to allow reductant to be inserted directly on the catalyst 154). In other embodiments, the reductant port 156 may be disposed on the inlet conduit 102 and configured to insert the reductant into the inlet conduit 102 upstream of the SCR system 150. In such embodiments, mixers, baffles, vanes or other structures may be positioned in the inlet conduit 102 so as to facilitate mixing of the reductant with the exhaust gas.

The reductant storage tank 110 is structured to store a reductant. The reductant is formulated to facilitate decomposition of the constituents of the exhaust gas (e.g., NOx gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In particular embodiments, the reductant can comprise an aqueous urea solution including 32.5% by volume of urea and 67.5% by volume of deionized water, including 40% by volume of urea and 60% by volume of deionize water, or any other suitable ratio of urea to deionized water.

A reductant insertion assembly 120 is operatively coupled to the reductant storage tank 110. The reductant insertion assembly 120 is configured to selectively insert the reductant into the SCR system 150 or upstream thereof (e.g., into the inlet conduit 102) or a mixer (not shown) positioned upstream of the SCR system 150. The reductant insertion assembly 120 may comprise various structures to facilitate receipt of the reductant from the reductant storage tank 110 and delivery to the SCR system 150.

The reductant insertion assembly 120 comprises a pump 122 configured to pump the reductant into the SCR system 150 at a pump operating pressure value and a pump operating flow rate value of the pump 122 at an operating insertion frequency value of the pump 122. The pump operating flow rate value and the operating insertion frequency value correspond to achieve a desired flow rate value may vary based on the particular pump 122 installed in the reductant insertion assembly 120 (e.g., due to part to part variations in pumps used in the reductant insertion assembly 120).

In various embodiments, the reductant insertion assembly 120 may also include filters or screens (e.g., to prevent solid particles of the reductant or contaminants from flowing into the pump 122) and/or valves (e.g., check valves) positioned upstream thereof to receive reductant from the reductant storage tank 110. In some embodiments, the pump 122 may comprise a positive displacement pump or a diaphragm pump but any other suitable pump may be used such as, for example, a centrifugal pump, a suction pump, etc.

The pump 122 may be configured to pressurize the reductant so as to provide the reductant to the SCR system 150 at a predetermined pump operating pressure value. Screens, check valves, pulsation dampers, or other structures may also be positioned downstream of the pump 122 to remove contaminants and/or facilitate delivery of the reductant to the SCR system 150. In various embodiments, the reductant insertion assembly 120 may also comprise a bypass line structured to provide a return path of the reductant from the pump 122 to the reductant storage tank 110.

A valve (e.g., an orifice valve) may be provided in the bypass line. The valve may be structured to allow the reductant to pass therethrough to the reductant storage tank 110 if an operating pressure of the reductant generated by the pump 122 exceeds a predetermined pressure so as to prevent over pressurizing of the pump, the reductant delivery lines, or other components of the reductant insertion assembly 120. In some embodiments, the bypass line may be configured to allow the return of the reductant to the reductant storage tank 110 during purging of the reductant insertion assembly 120 (e.g., after the aftertreatment system 100 is shut OFF). In other embodiments, a reductant return line may be fluidly coupled to a reductant delivery line upstream of the pump 122. In operation, the pump 122 may receive reductant at a constant flow rate. A portion of the reductant may continuously be returned to the reductant storage tank 110 via the reductant return line. Since the reductant portion is always returned to the reductant storage tank 110, the bypass valve can be excluded, thereby reducing complexity while providing protection from over-pressurization of the reductant insertion assembly 120.

In various embodiments, the reductant insertion assembly 120 may also comprise a blending chamber structured to receive pressurized reductant from a metering valve at a controllable rate. The blending chamber may also be structured to receive air (e.g., compressed air or portion of the exhaust gas), or any other inert gas (e.g., nitrogen), for example, from an air supply unit so as to deliver a combined flow of the air and the reductant to the SCR system 150 through the reductant port 156. In other embodiments, the reductant insertion assembly 120 may include an air less reductant insertion system.

The aftertreatment system 100 also comprises a reductant injector 128 operatively coupled to the reductant insertion assembly 120 and configured to insert the reductant (e.g., a combined flow of reductant and compressed air) into the SCR system 150. The reductant injector 128 may be configured to provide a reductant flow rate which may be a characteristic feature of the particular reductant injector 128 operatively coupled to the reductant insertion assembly 120. For example, the reductant injector 128 may comprise a nozzle having predetermined diameter. Part to part variation in the nozzle of the reductant injector 128 may cause the reductant injector 128 to have variation in flow rate through the nozzle from a desired flow rate (e.g., a variation of greater than 1%, 2% or 5%). In some embodiments, the reductant injector 128 comprises a passive nozzle having part to part variation. In other embodiments, the reductant injector 128 comprises an active nozzle, for example, a solenoid activated reductant injector and a nozzle integrated into a single housing, which may also have the part to part variation. In various embodiments, the reductant injector 128 may be positioned in the reductant insertion port 156 and structured to deliver a stream or a jet of the reductant into the internal volume of the housing 152 so as to deliver the reductant to the catalyst 154 of the SCR system 150.

In various embodiments, the reductant insertion assembly 120 may also comprise a dosing valve, for example positioned within a reductant delivery line for delivering the reductant from the reductant insertion assembly 120 to the SCR system 150. The dosing valve can comprise any suitable valve, for example a butterfly valve, a gate valve, a check valve (e.g., a tilting disc check valve, a swing check valve, an axial check valve, etc.), a ball valve, a spring loaded valve, an air assisted injector, a solenoid valve, or any other suitable valve. The dosing valve may be selectively opened to insert a predetermined quantity of the reductant for a predetermined time into the SCR system 150 or upstream therefrom.

As shown in FIG. 1A, the reductant insertion assembly 120 also comprises a pressure sensor 124 operably coupled to the pump 122 and configured to determine an operating pressure of the pump 122. In particular embodiments, the pressure sensor 124 may include a memory 125 configured to store predetermined calibration values of the pump 122 and provides the predetermined calibration values to the controller 170. The reductant insertion assembly 120 may also comprise a flow rate sensor 126 configured to measure a flow rate of the reductant through the pump 122.

As previously described herein, part to part variation in the pump 122 of the reductant insertion assembly 120 may cause the pump operating flow rate value of the pump 122 to deviate from a desired flow rate value. Furthermore, variation in the flow rate of the reductant injector 128 may lead to further deviation in the flow rate value of the reductant into the SCR system 150 relative to a desired flow rate value. To reduce such deviations and increase flow rate accuracy, the reductant insertion assembly 120 may be calibrated with a calibration injector so as to determine calibration values of the pump 122. In various embodiments, the calibration values may include a calibration pressure value, a calibration flow rate value, and a calibration insertion parameter value (e.g., a calibration insertion frequency value, a calibration speed value and/or a calibration stroke value) of the pump 122 corresponding to delivery of the reductant through the calibration injector at the calibration pressure value and the calibration flow rate value.

Figure 1B:
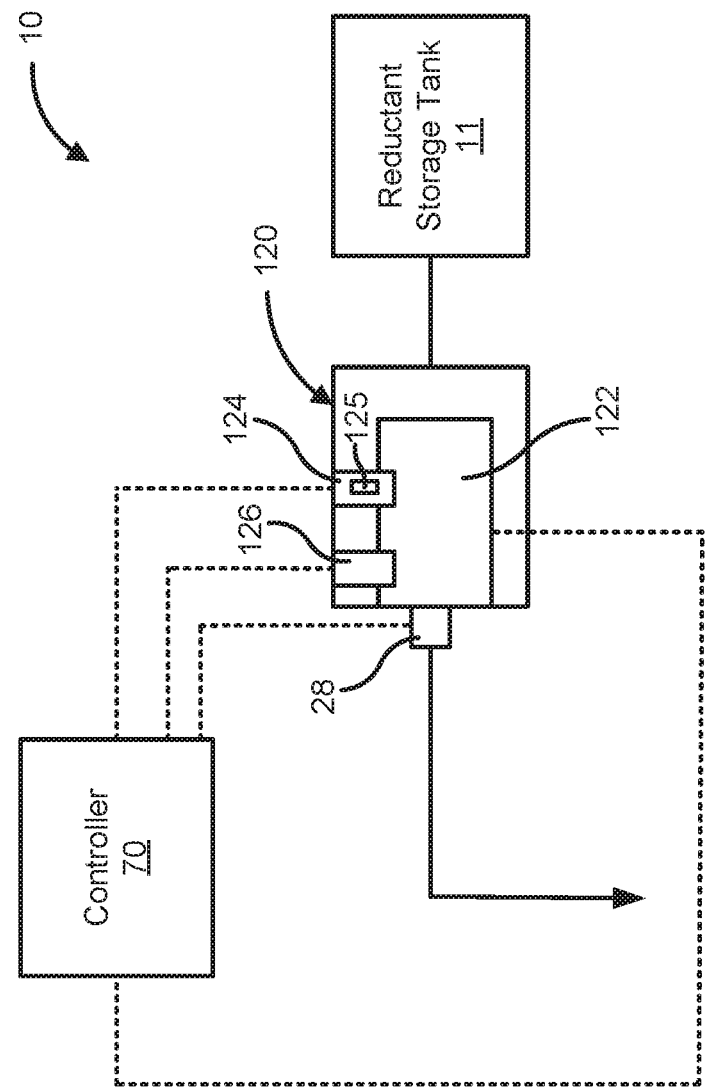
FIG. 1B is schematic illustration of a system for determining calibration values of the pump using a calibration injector, according to a particular embodiment.

For example, FIG. 1B is a schematic illustration of a calibration assembly 1 which may be used to determine the calibration values of the pump 122. The reductant insertion assembly 120 may be operatively coupled to a reductant storage tank 11 and a calibration injector 28. A calibration controller 70 may be operatively coupled to the pump 122, the pressure sensor 124, the flow rate sensor 126 and the calibration injector 28. The calibration injector 28 may include a high accuracy reductant injector capable of providing a reductant flow rate with very low variation (e.g., less than ±1% variation), and may be configured to provide a calibration flow rate value at a calibration pressure value (e.g., 8 liters per hour at 8 barg) for any pump (e.g., the pump 122) operatively coupled thereto. In various embodiments, the reductant insertion assembly 120 may be operatively coupled in a closed loop with the reductant storage tank 11.

In some embodiments, the calibration controller 70 may be configured to activate the pump 122 at a fixed calibration pressure value (e.g., 4, 5, 6, 7, 8, 9 or 10 barg) and determine a corresponding calibration insertion parameter value that the pump 122 operates at to provide a calibration flow rate value (e.g., 4, 5, 6, 7, 8, 9 or 10 liters per hour). In various embodiments, the pump 122 may include a positive displacement pump (e.g., having a piston and cylinder) or a diaphragm pump and the calibration insertion parameter value may include a calibration insertion frequency value (i.e., a number of times a piston stroke of the pump 122 occurs per unit time) or a calibration stroke value (e.g., a length of a piston stroke of the pump 122). In other embodiments, the pump 122 may include a centrifugal pump calibration insertion parameter value may comprise a calibration speed value (e.g., a rotational speed of the pump 122).

In particular embodiments, the calibration controller 70 may be configured to activate the pump 122 at a fixed insertion parameter value (e.g., a fixed calibration insertion frequency value, a fixed calibration speed value and/or a fixed calibration stroke value) of the pump 122 and determine the variations in pump flow rate value and pump operating pressure value of the pump 122 at the fixed calibration insertion parameter value.

The calibration controller 70 may store the determined calibration parameter values in the memory 125 provided on the pressure sensor 124, for example, as a digital or analog value. For example, the calibration controller 70 may be configured to store the fixed calibration pressure value (e.g., 4, 5, 6, 7, 8, 9 or 10 liters per hour) at which the pump 122 was operated and the corresponding insertion parameter value, for example, the calibration insertion frequency, of the pump 122 at which the pump 122 provided the desired calibration flow rate value (e.g., 4, 5, 6, 7, 8, 9 or 10 liters per hour).

In various embodiments, the determined calibration parameter values may include a single calibration flow rate value and a single calibration insertion parameter value (e.g., a single calibration insertion parameter value) corresponding to the singe calibration flow rate value. In other embodiments, the determined calibration parameter values may comprise a plurality of calibration flow rate values and a corresponding plurality of calibration insertion parameter values (e.g., a corresponding plurality of calibration insertion frequency values). In still other embodiments, the determined calibration parameter values may comprise a slope of a range of calibration flow rate values vs a corresponding range of the calibration insertion parameter values (e.g., corresponding range of calibration insertion frequency values).

Referring again to FIG. 1A, the controller 170 may be communicatively coupled to the first sensor 103 and may be configured to receive a first sensor signal from the first sensor 103, for example, to determine an amount of NOx gases and/or an exhaust flow rate of the exhaust gas flowing into the SCR system 150. The controller 170 may also be communicatively coupled to the second sensor 105 and may be configured to determine an amount of NOx gases, or ammonia included in the exhaust gas being expelled into the environment. In some embodiments, the controller 170 may also be communicatively coupled to the engine 10 and configured to determine one or more engine operating parameters (e.g., engine speed, engine torque, exhaust gas flow rate, fuel insertion rate, intake air flow rate, etc.) associated with the engine 10. In various embodiments, the controller 170 may be configured to determine a desired flow rate value of the reductant into the SCR system 150 based on an amount of NOx gases and/or an exhaust flow rate of the exhaust gas flowing into the SCR system 150, and/or one or more engine operating parameter. The desired reductant flow rate may correspond to an amount of reductant which may optimally reduce the amount of NOx gases in the exhaust gas (e.g., greater than 99% of the amount of NOx gases in the exhaust gas), and cause minimum ammonia slip.

The controller 170 is communicatively coupled to the reductant insertion assembly 120, for example, the pump 122, the pressure sensor 124 and the flow rate sensor 126. In various embodiments, the controller 170 may also be communicatively coupled to the reductant injector 128 and may be configured to determine a flow rate of the reductant through the reductant injector 128 and/or open or close a valve associated with the reductant injector 128. The controller 170 may be operably coupled to the first sensor 103, the fuel rate sensor 130 and/or other components of the engine 10, or a vehicle including the engine 10 using any type and any number of wired or wireless connections. It should be appreciated that while the reductant injector is shown in FIG. 1A as being positioned remotely from reductant port 156 (which may include a nozzle disposed therein), in some embodiments, the reductant injector 128 may be integrated with the nozzle (e.g., within a single housing), and positioned in the reductant port 156. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

The controller 170 may be configured to receive the predetermined calibration values corresponding to the delivery of the reductant by the pump 122 through the calibration injector 28. For example, the controller 170 may receive the predetermined calibration values from the memory 125 of the pressure sensor 124 after the reductant insertion assembly 120 is installed or integrated on the aftertreatment system 100 so as to fluidly couple the pump 122 with the reductant injector 128. The controller 170 may receive the predetermined calibration values from the pressure sensor 124 when there is relative pressure in the reductant insertion assembly, for example, when the controller 170 and the reductant insertion assembly 120 are activated (e.g., turned ON) for the first time after being coupled together with the pump 122 being inactivated (e.g., turned OFF). The controller 170 may store the predetermined calibration values corresponding to the pump 122 in a memory of the controller 170 and may use the predetermined calibration values to provide highly accurate insertion of the reductant by the reductant insertion assembly 120 into the aftertreatment system 100.

As described before, part to part variation in a pump (e.g., the pump 122) of a reductant insertion assembly (e.g., the reductant insertion assembly 120) and a reductant injector (e.g., the reductant injector 128) may cause deviation in flow rate of the reductant through the reductant injector 128 into the SCR system 150, for example, a deviation of greater than ±1%, 2%, 5% or even more. The controller 170 is configured to determine an insertion time (e.g., a pump active or ON time) of the reductant injector 128 for delivering the reductant through the reductant injector 128 based on the desired flow rate, a pump operating parameter value of the pump 122 and the predetermined calibration values. The controller 170 may activate the reductant injector 128 for the insertion time. In particular embodiments, the pump operating parameter value may comprise a pump insertion frequency value corresponding to a pump operating pressure value being equal to the calibration pressure value, so that the insertion time of the reductant injector 128 is based on the pump insertion frequency value.

Expanding further, in particular embodiments, the predetermined calibration values of the pump 122 may comprise a fixed calibration pressure value at which the pump 122 was calibrated with the calibration injector 28. Furthermore, the predetermined calibration values may comprise one or more calibration flow rate values which were obtained from the pump 122 during the calibration run with the calibration injector 28, and corresponding one or more calibration insertion parameter values (e.g., calibration insertion frequency value) which caused the pump 122 to obtain the one or more calibration flow rate values.

During operation of the reductant insertion assembly 122 with the reductant injector 128, the variation in the reductant injector flow rate value of the reductant injector 128 may cause the pump 122 to provide a pump operating flow rate value which is different from a calibration flow rate value for obtaining a pump operating pressure value which is equal to the calibration pressure value. The controller 170 may be configured to adjust the flow rate through the reductant injector 128 by increase or decreasing a reductant injector insertion time based on the corresponding increase or decrease of the pump insertion parameter value (e.g., a pump insertion frequency value) relative to the calibration insertion parameter value (e.g., the calibration insertion frequency value) so as to obtain have a pump operating pressure value which is equal to the calibration pressure value and deliver a desired amount of reductant into the SCR system 150 per unit time (i.e., provide a desired flow rate of the reductant). In particular embodiments, the controller 170 may be configured to determine the insertion time for the reductant injector 128 using the following equation:

$$\text{Insertion Time (\%)} = \frac{A}{\left(Y \times \frac{B}{Z}\right)} \quad (1)$$

where A is the desired flow rate value, Y is the pump operating insertion parameter value (e.g., a pump operating insertion frequency value) of the pump 122 at a pump operating pressure value equal to the calibration pressure value, Z is the calibration insertion parameter value (e.g., a calibration insertion frequency value) of the pump 122 at the calibration pressure value, and B is the calibration flow rate value of the pump 122 corresponding to calibration insertion parameter value. The insertion time indicates a percentage of the time that the reductant injector 128 is activated (i.e., is in an ON or open state) so as to insert a desired amount of reductant into the SCR system 150 over a period of time, relative to a calibration insertion time that the pump 122 would have used to insert the same amount of reductant into the SCR system 150 if used with the calibration injector 28. In this manner, the controller 170 ensures highly accurate delivery of the reductant into the SCR system 150 (e.g., within ±1% of a desired flow rate) regardless of a pump and reductant injector combination used in the aftertreatment system 100.

Figure 2:
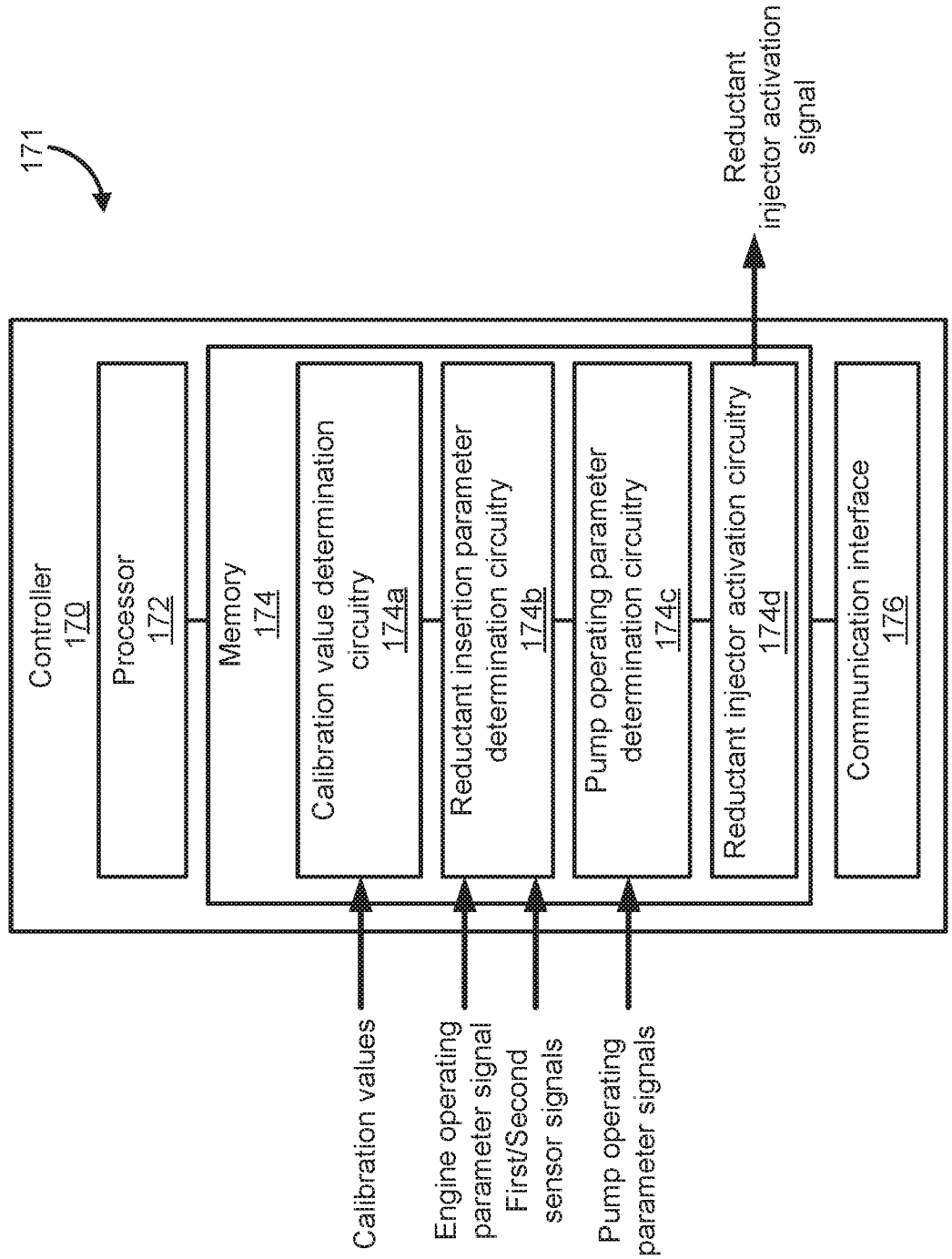
FIG. 2 is a schematic block diagram of an embodiment of a control circuitry that may be included in the aftertreatment system of FIG. 1.

In particular embodiments, the controller 170 can be included in a control circuitry. For example, FIG. 2 is a schematic block diagram of a control circuitry 171 that comprises the controller 170, according to an embodiment. The controller 170 comprises a processor 172, a memory 174, or any other computer readable medium, and a communication interface 176. Furthermore, the controller 170 includes a calibration value determination circuitry 174a, a reductant insertion parameter determination circuitry 174b, a pump operating parameter determination circuitry 174c and a reductant injector activation circuitry 174d. It should be understood that the controller 170 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the calibration value determination circuitry 174a, the reductant insertion parameter determination circuitry 174b, the pump operating parameter determination circuitry 174c and the reductant injector activation circuitry 174d are embodied as machine or computer-readable media (e.g., stored in the memory 174) that is executable by a processor, such as the processor 172. As described herein and amongst other uses, the machine-readable media (e.g., the memory 174) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the calibration value determination circuitry 174a, the reductant insertion parameter determination circuitry 174b, the pump operating parameter determination circuitry 174c and the reductant injector activation circuitry 174d are embodied as hardware units, such as electronic control units. As such, the calibration value determination circuitry 174a, the reductant insertion parameter determination circuitry 174b, the pump operating parameter determination circuitry 174c and the reductant injector activation circuitry 174d may be embodied as one or more circuitry components including, but not limited to, processing circuitry, network interfaces, peripheral devices, input devices, output devices, sensors, etc.

In some embodiments, the calibration value determination circuitry 174a, the reductant insertion parameter determination circuitry 174b, the pump operating parameter determination circuitry 174c and the reductant injector activation circuitry 174d may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the calibration value determination circuitry 174a, the reductant insertion parameter determination circuitry 174b, the pump operating parameter determination circuitry 174c and the reductant injector activation circuitry 174d may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus the calibration value determination circuitry 174a, the reductant insertion parameter determination circuitry 174b, the pump operating parameter determination circuitry 174c and the reductant injector activation circuitry 174d may also include programmable hardware devices such as field programmable gate arrays, programmable array logic, programmable logic devices or the like. In this regard, the calibration value determination circuitry 174a, the reductant insertion parameter determination circuitry 174b, the pump operating parameter determination circuitry 174c and the reductant injector activation circuitry 174d may include one or more memory devices for storing instructions that are executable by the processor(s) of the calibration value determination circuitry 174a, the reductant insertion parameter determination circuitry 174b, the pump operating parameter determination circuitry 174c and the reductant injector activation circuitry 174d. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect the calibration value determination circuitry 174a, the reductant insertion parameter determination circuitry 174b, the pump operating parameter determination circuitry 174c and the reductant injector activation circuitry 174d. Thus, the depicted configuration represents the aforementioned arrangement where the calibration value determination circuitry 174a, the reductant insertion parameter determination circuitry 174b, the pump operating parameter determination circuitry 174c and the reductant injector activation circuitry 174d are embodied as machine or computer-readable media. However, as mentioned above, this illustration is not meant to be limiting as the present disclosure contemplates other embodiments such as the aforementioned embodiment where the calibration value determination circuitry 174a, the reductant insertion parameter determination circuitry 174b, the pump operating parameter determination circuitry 174c and the reductant injector activation circuitry 174d, or at least one circuit of the calibration value determination circuitry 174a, the reductant insertion parameter determination circuitry 174b, the pump operating parameter determination circuitry 174c and the reductant injector activation circuitry 174d are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the calibration value determination circuitry 174a, the reductant insertion parameter determination circuitry 174b, the pump operating parameter determination circuitry 174c and the reductant injector activation circuitry 174d) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with the first sensor 103, the second sensor 105, the engine 10, the reductant insertion assembly 120 (e.g., the pump 122, the pressure sensor 124 and/or the flow rate sensor 126), or another controller (e.g., an engine control unit). The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The calibration value determination circuitry 174a is configured to receive the predetermined calibration values from the reductant insertion assembly 120 and store the predetermined calibration values, for example, in the memory 174. For example, the predetermined calibration values may be stored in the memory 125 of the pressure sensor 124 or in any other memory or storage device provided in the reductant insertion assembly 120. The calibration value determination circuitry 174a may receive the calibration values, for example, the calibration pressure value, the calibration flow rate value and the calibration insertion parameter value (e.g., the calibration insertion frequency value, the calibration speed value and/or the calibration stroke value) of the pump 122 corresponding to the calibration flow rate value after the reductant insertion assembly 120 is communicatively coupled to the controller 170 and is, for example, activated or turned ON for the first time or after replacement of the pump 122 or a the reductant injector 128 (e.g., during a service interval). Furthermore, the calibration values may be received by the calibration value determination circuitry 174a when there is no positive pressure in the reductant insertion assembly 120, i.e., the pump 122 is turned OFF or otherwise, not active.

The reductant insertion parameter determination circuitry 174b is configured to receive an engine operating parameter signal, a first sensor signal and/or a second sensor signal and determine a desired flow rate of the reductant into the SCR system 150 therefrom. For example, the reductant insertion parameter determination circuitry 174b may receive an engine operating parameter signal (e.g., an engine speed, an engine torque, an exhaust gas flow rate, fuel insertion rate, intake air flow rate, etc.) from the engine 10 or one or more sensors coupled to the engine 10 and determine a desired flow rate of the reductant into the SCR system 150. In other embodiments, the reductant insertion parameter determination circuitry 174b may receive a first sensor signal from the first sensor 103 (e.g., indicative of an amount of NOx in the exhaust gas entering the SCR system 150) and/or a second sensor signal from the second sensor 105 (e.g., corresponding to an amount of NOx gases and/or ammonia) downstream of the SCR system 150 and determine the desired reductant flow rate therefrom. The desired reductant flow rate may correspond to an amount of reductant to be inserted into the SCR system 150 for achieving optimal reduction of NOx gases included in the exhaust gas (e.g., facilitate reduction of greater than 99% of the NOx gases included in the exhaust gas by the catalyst 154).

The pump operating parameter determination circuitry 174c may be configured to receive one or more signals from the pump 122, the pressure sensor 124 and/or the flow rate sensor 126, and determine a pump operating parameter value therefrom. For example, the pump operating parameter value may include a pump insertion frequency value corresponding to the pump operating pressure value being equal to the calibration pressure value. In other words, the operating parameter value may include a pump insertion frequency value of the pump 122 when the pump 122 is operated at the same pressure as the calibration pressure value. The pump insertion frequency value may be different from the insertion frequency at the calibration pressure value (i.e., observed during calibration corresponding to the same target pressure), for example, because of a different flow rate value or variation in flow rate value of the reductant injector 128 from an expected flow rate thereof, which may cause the pump 122 to have a pump insertion frequency value which is different from the calibration pressure value even though the pump 122 is operating at the pump operating pressure value which is equal to the calibration pressure value.

The pump activation circuitry 174d is configured to determine an insertion time of the reductant injector 128 for delivering the reductant through the reductant injector 128 based on the desired flow rate value, the pump operating parameter value of the pump 122 and the predetermined calibration values. For example, the pump activation circuitry 174d may determine the insertion time of the reductant injector 128 based on the desired flow rate value determined by the reductant insertion parameter determination circuitry 174b, the pump insertion frequency value determined by the pump operating parameter determination circuitry 174c and the calibration insertion frequency of the pump 122 determined by the calibration value determination circuitry 174a and determine the insertion time based on these values (e.g., using equation 1). The reductant injector activation circuitry 174d may generate a reductant injector activation signal configured to activate the reductant injector 128 for the insertion time, so as to insert the reductant at the desired flow rate, or otherwise insert a desired amount of reductant into the SCR system 150 through the reductant injector 128.

Figure 3:
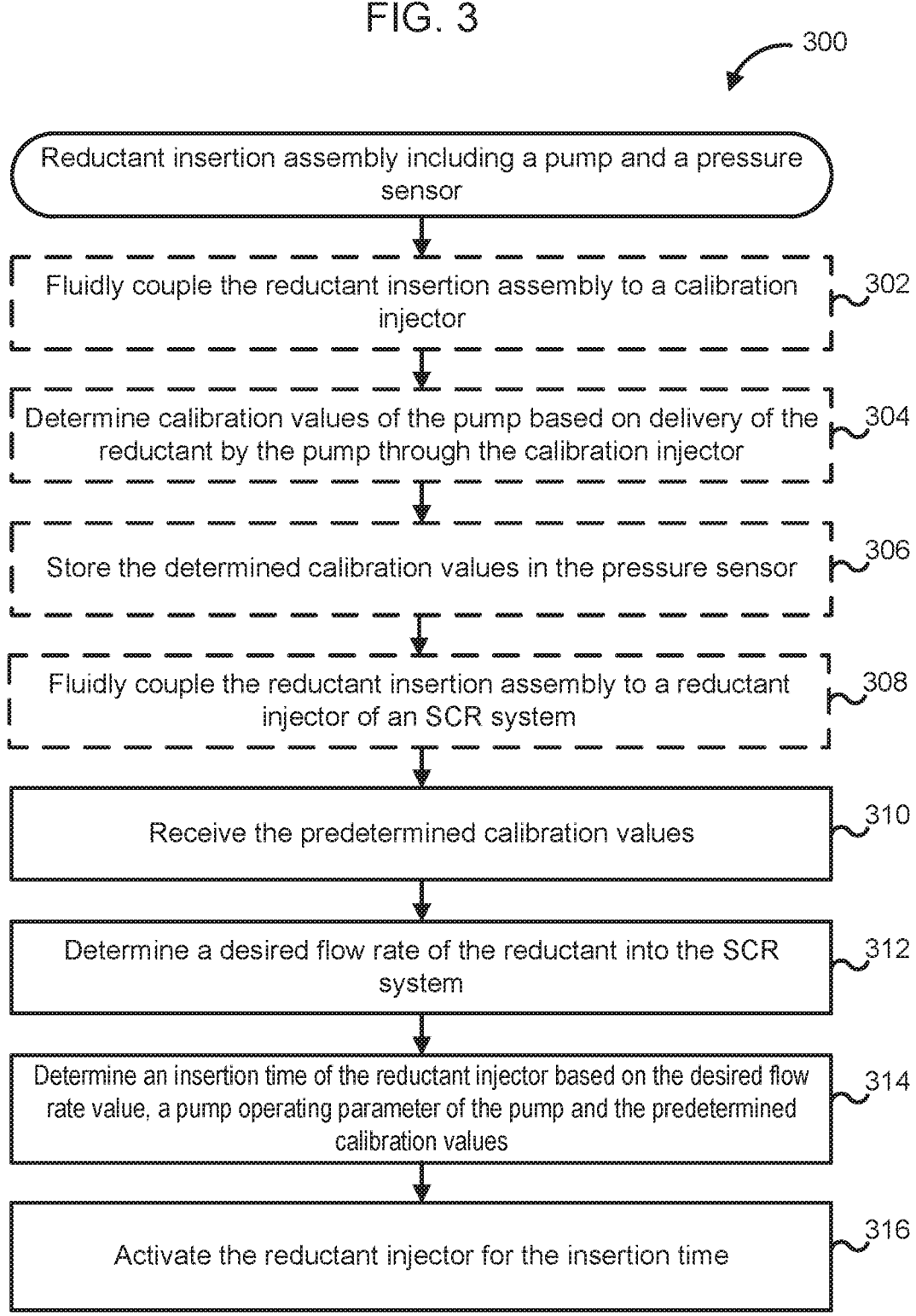
FIG. 3 is a schematic flow diagram of a method for increasing a reductant insertion accuracy of a pump with any injector, according to an embodiment.

FIG. 3 is a schematic flow diagram of an example method 300 for accurately inserting a reductant into an SCR system (e.g., the SCR system 150) using a reductant insertion assembly (e.g., the reductant insertion assembly 120) having a pump (e.g., the pump 122) and a pressure sensor (e.g., the pressure sensor 124). The reductant insertion assembly may be operatively coupled to a reductant injector (e.g., the reductant injector 128) configured to insert the reductant into the SCR system.

In some embodiments, the method 300 comprises fluidly coupling the reductant insertion assembly to a calibration injector, at 302. For example, the pump 122 of the reductant insertion assembly 120 may be operatively coupled to the calibration injector 28 configured to provide a reductant flow rate therethrough with minimal variation (e.g., within ±1% of an expected flow rate therethrough).

At 304, calibration values of the pump are determined based on the delivery of the reductant by the pump through the calibration injector. For example, the calibration controller 70 may activate the pump 122 and determine one or more calibration values, for example, a calibration pressure value, a calibration flow rate value and a calibration insertion parameter value (e.g., a calibration insertion frequency value, a calibration speed value and/or a calibration stroke value) of the pump 122 corresponding to delivery of the reductant through the calibration injector 28 at the calibration pressure value and the calibration flow rate value, as previously described herein.

In some embodiments, the calibration pressure value may comprise a fixed calibration pressure value. For example, the pump 122 of the reductant insertion assembly 120 may be calibrated at a fixed pressure value of the pump (e.g., at 8 barg). In particular embodiments, the determined calibration value comprises a single calibration flow rate value and a single calibration insertion parameter value (e.g., a single calibration insertion frequency value). For example, the calibration controller 70 may operate the pump 122 to pump reductant through the calibration injector 28 at a single calibration flow rate value (e.g., 8 liters per hour) and determine the corresponding insertion frequency value of the pump 122 (i.e., the calibration insertion frequency value).

In other embodiments, the determined calibration value comprises a plurality of calibration flow rate values and a corresponding plurality of the calibration insertion parameter values. For example, the calibration controller 70 may be configured to operate the pump 122 at multiple calibration flow rate values (e.g., 2, 4, 6, 8, 10 liters per hour or any other calibration flow rate value) and determine a corresponding calibration insertion parameter value (e.g., a calibration insertion frequency value) for each of the multiple flow rates. In still other embodiments, the determined calibration value may comprise a slope of a range of flow rate values vs a corresponding range of the calibration insertion parameter values. For example, the calibration controller 70 may be configured to vary the flow rate through the calibration injector 28 between a range of calibration flow rate values (e.g., 2-10 liters per hour or any other suitable range), determine the corresponding calibration insertion parameter values (e.g., the calibration insertion frequency values) and determine the slope therefrom. The slope or gradient may correspond to a rate of change of calibration insertion parameter value in response to the changing calibration flow rate value through the calibration injector 28, and may be used to determine a calibration insertion parameter value corresponding to any calibration flow rate value.

At 306, the predetermined calibration values may be stored in the pressure sensor. For example, the calibration controller 70 may be configured to store the predetermined calibration values on the memory 125 of the pressure sensor 124 (e.g., in analog or digital format). In other embodiments, the calibration controller 70 may be configured to store the predetermined calibration values on any other memory or storage device provided in the reductant insertion assembly 120.

At 308, the reductant insertion assembly is operatively coupled to a reductant injector of the SCR system. For example, the reductant insertion assembly 120 may be installed on the aftertreatment system 100 such that the reductant insertion assembly 120 (e.g., the pump 122 of the reductant insertion assembly 120) is operatively coupled to the reductant injector 128. Furthermore, the controller 170 may be communicatively coupled to the reductant insertion assembly 120 (e.g., to the pump 122, the pressure sensor 124, and the flow rate sensor 126).

At 310, the predetermined calibration values are received. For example, the controller 170 receives the predetermined calibration values from the memory 125 of the pressure sensor 124. In various embodiments, the controller 170 may be configured to receive the predetermined calibration values when the reductant insertion assembly 120 is not pressurized, for example, when the reductant insertion assembly 120 is communicatively coupled to the controller 170 for the first time and the pump 122 is turned OFF, or otherwise, in an inactive state. In other embodiments, the predetermined calibration values may be received when the reductant insertion assembly 120 is pressurized, is in a transient state or at any other suitable time.

At 312, a desired flow rate of the reductant into the SCR system is determined. For example, the controller 170 may determine a desired flow rate of the reductant into the SCR system 150 based on one or more of the engine operating parameters, the first sensor signal (e.g., indicative of an amount of NOx gases in the exhaust gas entering the SCR system 150 and/or an exhaust flow rate) and the second sensor signal (e.g., indicative of an amount of NOx gases or ammonia in the exhaust gas downstream of the SCR system 150).

At 314, an insertion time of the reductant injector for delivering the reductant through the reductant injector is determined based on the desired flow rate value, a pump operating parameter value of the pump and the predetermined calibration values. For example, the controller 170 may determine the insertion time or otherwise, the ON (or active) time of the reductant injector 128 based on the desired reductant flow rate determined by the controller 170, the pump operating parameter value (e.g., the operating insertion frequency value) of the pump 122, and the predetermined calibration values (e.g., the calibration insertion frequency at a particular calibration flow rate value and the calibration pressure value), as previously described herein. In particular embodiments, the controller 170 may be configured to determine the insertion time using equation 1.

At 316, the reductant injector is activated for the insertion time. For example, the controller 170 may activate the reductant injector or otherwise turn ON the reductant injector for the insertion time. In various embodiments, the insertion time of the reductant injector may include a percentage of a time that the pump 122 would have been active or ON if the pump 122 was able to deliver the desired amount of reductant at a pump operating pressure value equal to the calibration pressure value and a pump insertion parameter value equal to the calibration insertion parameter value to obtain the desired flow rate value.

Experimental Results

The following section details calibration results of various pumps of a reductant insertion assembly with a calibration injector, and delivery of a reductant with high accuracy using the pump of the reductant insertion assembly with a reductant injector of an aftertreatment system. It should be understood that these examples are for illustrative purposes only and should not be construed as limiting the disclosure in any shape or form.

Table 1 shows calibration values obtained for a low flow pump, a nominal flow pump and a high flow pump of a reductant insertion assembly with a calibration injector. The calibration injector includes a Thomas Magnete pump having a shot to shot accuracy of ±1% and is configured to provide a target flow rate at a target pressure. Each of the pumps were calibrated at a fixed pressure of 8 barg, and a calibration insertion frequency of each pump was determined for a fixed flow rate of 8 liters per hour. The maximum dosing capacity of the reductant insertion assembly may set by the highest flow pump and the lowest flow injector.

TABLE 1

Calibration insertion frequency values for various pumps at a fixed calibration pressure and calibration flow rate

| Pump Type | Expected Frequency at Fixed Calibration Pressure of 8 barg |
|---|---|
| Low flow pump (−10% variation) | 32 Hz for 8 liters per hour |
| Nominal flow pump (0%) | 28.8 Hz for 8 liters per hour |
| High flow pump (+10% variation) | 25.6 Hz for 8 liters per hour |

Table 2 and table 3 shows results of using the pump for highly accurate insertion of a reductant by a pre-calibrated high flow pump and a low flow pump operatively coupled with a low flow reductant injector, a nominal flow reductant injector and a high flow reductant injector by using predetermined calibration values for each pumps and adjusting an insertion time of the reductant injector coupled thereto. The pumps were operated to reach the desired flow rate at a pump operating pressure value of 8 barg equal to a calibration pressure value.

TABLE 2

Operation of a high flow pump with various reductant injectors calibrated at 8 barg, and having a calibration insertion frequency of 26 Hz and calibration pump flow volume of 82 mm$^3$ per stroke for a calibration flow rate of 8 liters per hour.

| Reductant Injector Type | Pump operating insertion frequency (Hz) | Insertion time for desired flow rate of 4 L/h | Insertion time for desired flow rate of 8 L/h |
|---|---|---|---|
| Low flow reductant injector (−8%) | 21.84 | On time = 59.52% (4/(21.84/26 × 8)) | Not possible at 8 barg |
| Nominal flow reductant injector (0%) | 23.92 | On time = 54.34% (4/(23.92/26 × 8)) | Not possible at 8 barg |
| High flow reductant injector (+8%) | 26.00 | On time = 50% (4/(26.00/26 × 8) | 100% |

TABLE 3

Operation of a low flow pump with various reductant injectors calibrated at 8 barg and having an insertion frequency of 31 Hz and pump flow volume of 72 mm$^3$ per stroke for a calibration flow rate of 8 liters per hour.

| Reductant Injector Type | Pump operating insertion frequency (Hz) | Insertion time for desired flow rate of 4 L/h | Insertion time for desired flow rate of 8 L/h |
|---|---|---|---|
| Low flow reductant injector (−8%) | 26.04 | On time = 59.52% (4/(26.04/31 × 8)) | Not possible at 8 barg |
| Nominal flow reductant injector (0%) | 28.52 | On time = 54.34% (4/(28.52/31 × 8)) | Not possible at 8 barg |
| High flow reductant injector (+8%) | 31.00 | On time = 50% (4/(31/31 × 8) | 100% |

As observed from tables 2 and 3, the pump operating insertion frequency of the high flow pump and the low flow pump is equal to their respective calibration insertion frequencies (i.e., 26 Hz and 31 Hz, respectively) when operated with a high flow reductant injector. However, the pump operating insertion frequencies deviate from calibration insertion frequency when the high and low flow pumps are operated with the nominal flow and the low flow reductant injectors. In this scenario, the insertion time of for the reductant injectors is calculated and the reductant injectors activated accordingly. For the nominal and low flow reductant injectors, the pump operating insertion frequency value is less than the calibration insertion frequency value. Therefore, to achieve the desired flow rate at the operating pressure value being equal to the calibration pressure value of 8 barg, the insertion time of the reductant injector is increased as determined using equation 1. While the increase in insertion time is possible for a desired flow rate of 4 liters per hour which is 50% of the calibration flow rate, at a desired flow rate of 8 liters per hour, any increase in insertion time may not be possible as it would require the reductant injector to have an insertion time of greater than 100%. In such scenarios, the pump operating pressure may have to be increased or other insertion parameters may have to be varied so to provide the reductant at the desired flow rate.

Figure 4:
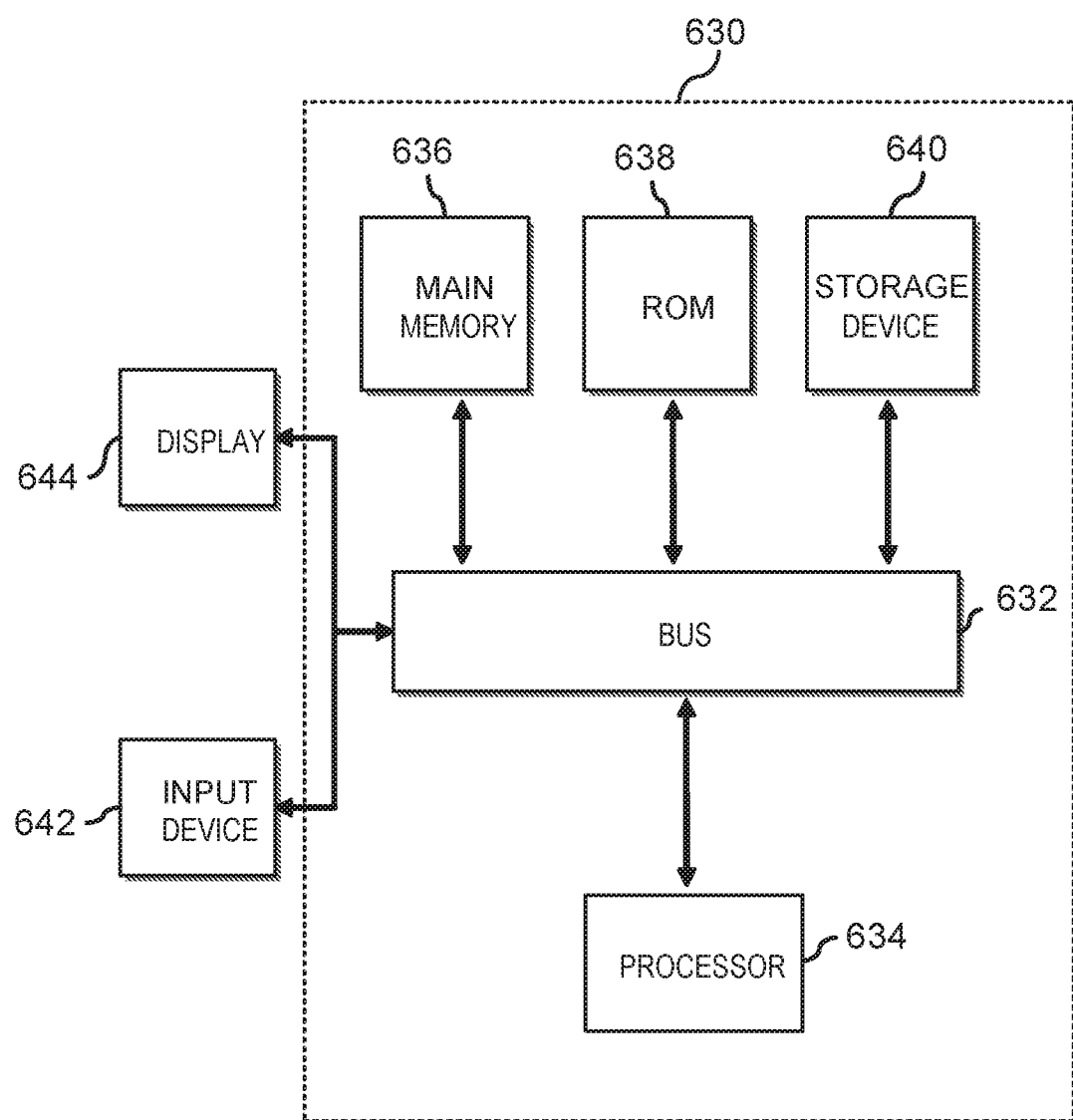
FIG. 4 is a schematic block diagram of a computing device which may be used as the controller shown in FIGS. 1 and/or 2.

In some embodiments, the controller 170, the control circuitry 171, or any of the controller or control circuitries described herein can comprise a system computer of an apparatus or system which comprises the aftertreatment system 100 (e.g., a vehicle, an engine or generator set, etc.). For example, FIG. 4 is a block diagram of a computing device 630 in accordance with an illustrative implementation. The computing device 630 can be used to perform any of the methods or the processes described herein, for example, the method 300. In some embodiments, the controller 170 can comprise the computing device 630. The computing device 630 comprises a bus 632 or other communication component for communicating information. The computing device 630 can also comprise one or more processors 634 or processing circuits coupled to the bus 632 for processing information.

The computing device 630 also comprises main memory 636, such as a random access memory (RAM) or other dynamic storage device, coupled to the bus 632 for storing information and instructions to be executed by the processor 634. Main memory 636 can also be used for storing position information, temporary variables, or other intermediate information during execution of instructions by the processor 634. The computing device 630 may further comprise ROM 638 or other static storage device coupled to the bus 632 for storing static information and instructions for the processor 634. A storage device 640, such as a solid-state device, magnetic disk or optical disk, is coupled to the bus 632 for persistently storing information and instructions. For example, instructions corresponding operations of the method 300 can be stored on the storage device 640.

The computing device 630 may be coupled via the bus 632 to a display 644, such as a liquid crystal display or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the methods described herein can be implemented by the computing device 630 in response to the processor 634 executing an arrangement of instructions contained in main memory 636 (e.g., the operations of the method 300). Such instructions can be read into main memory 636 from another non-transitory computer-readable medium, such as the storage device 640. Execution of the arrangement of instructions contained in main memory 636 causes the computing device 630 to perform the illustrative processes described herein. One or more processors in a multi-processing arrangement may also be employed to execute the instructions contained in main memory 636. In alternative implementations, hard-wired circuitry may be used in place of or in combination with software instructions to effect illustrative implementations. Thus, implementations are not limited to any specific combination of hardware and software.

Although an example computing device has been described in FIG. 4, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs (i.e., one or more circuitries of computer program instructions) encoded on one or more computer storage media for execution by, or to control the operation of, data processing apparatus. A computer storage medium comprises a non-transitory computer readable medium and can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including, by way of example, a programmable processor, a computer, a system on a chip, or multiple ones, or combinations of the foregoing. The apparatus can comprise special purpose logic, e.g., an FPGA (field programmable gate array) or an ASIC (application-specific integrated circuit). In addition to hardware, the apparatus can also comprise code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuitry, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer, on multiple computers that are located at one site, or distributed across multiple sites and interconnected by a communication network.

Processors suitable for the execution of a computer program comprise, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also comprise, or be operatively coupled to receive data from or transfer data to, or both, one or more mass storage devices for storing data (e.g., magnetic, magneto-optical disks, or optical disks). However, a computer need not have such devices. Devices suitable for storing computer program instructions and data comprise all forms of non-volatile memory, media and memory devices, including, by way of example, semiconductor memory devices (e.g., EPROM, EEPROM, and flash memory devices) or magnetic disks (e.g., internal hard disks or removable disks). The processor and the memory can be supplemented by, or incorporated in, special purpose logic.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system comprising:
   a selective catalytic reduction system;
   a reductant injector operatively coupled to the selective catalytic reduction system;
   a reductant insertion assembly operatively coupled to the reductant injector, the reductant insertion assembly comprising:
   a pump configured to pump a reductant through the reductant injector, and
   a pressure sensor including a memory configured to store predetermined calibration values of the pump corresponding to delivery of a reductant by the pump through a calibration injector; and
   a controller operatively coupled to the reductant insertion assembly, the controller configured to:
   receive the predetermined calibration values from the pressure sensor,
   determine a desired flow rate value of the reductant into the selective catalytic reduction system,
   determine an insertion time of the reductant injector for delivering the reductant through the reductant injector based on the desired flow rate value, a pump operating parameter value of the pump, and the predetermined calibration values, and
   activate the reductant injector for the insertion time.

2. The aftertreatment system of claim 1, wherein the predetermined calibration values comprise at least one of a calibration pressure value, a calibration flow rate value, and a calibration insertion parameter value of the pump corresponding to delivery of the reductant through the calibration injector at the calibration pressure value and the calibration flow rate value.

3. The aftertreatment system of claim 2, wherein the calibration insertion parameter value comprises at least one of a calibration insertion frequency value, a calibration speed value or a calibration stroke value of the pump.

4. The aftertreatment system of claim 2, wherein the pump operating parameter value comprises a pump operating insertion frequency value corresponding to a pump operating pressure value being equal to the calibration pressure value, and wherein the insertion time of the reductant injector is based on the pump insertion frequency value.

5. The aftertreatment system of claim 2, wherein the calibration pressure value comprises a fixed calibration pressure value.

6. The aftertreatment system of claim 5, wherein the predetermined calibration value comprises a single calibration flow rate value and a corresponding single calibration insertion parameter value.

7. The aftertreatment system of claim 5, wherein the predetermined calibration value comprises a plurality of calibration flow rate values and a corresponding plurality of the calibration insertion parameter values.

8. The aftertreatment system of claim 5, wherein the predetermined calibration values comprises a slope of a range of flow rate values vs a corresponding range of the calibration insertion parameter values.

9. A method for delivering a reductant into a selective catalytic reduction system via a reductant injector using a reductant insertion assembly comprising a pump and a pressure sensor, the method comprising;
   receiving predetermined calibration values of the pump corresponding to delivery of a reductant by the pump through a calibration injector, the predetermined calibration values stored on a memory of the pressure sensor;
   determining a desired flow rate of the reductant into the selective catalytic reduction system;

determining an insertion time of the reductant injector for delivering the reductant through the reductant injector based on the desired flow rate value, a pump operating parameter value of the pump and the predetermined calibration values; and activating the reductant injector for the insertion time.

10. The method of claim 9, further comprising:

prior to receiving the predetermined calibration values, fluidly coupling the reductant insertion assembly to the calibration injector;

determining calibration values of the pump based on delivery of the reductant by the pump through the calibration injector; and storing the predetermined calibration values in the memory of the pressure sensor.

11. The method of claim 9, wherein the predetermined calibration values comprise at least one of a calibration pressure value, a calibration flow rate value, and a calibration insertion parameter value of the pump corresponding to delivery of the reductant through the calibration injector at the calibration pressure value and the calibration flow rate value.

12. The method of claim 11, wherein the calibration insertion parameter value comprises at least one of a calibration insertion frequency value, a calibration speed value or a calibration stroke value of the pump.

13. The method of claim 11, wherein the pump operating parameter value comprises a pump insertion frequency value corresponding to a pump operating pressure value being equal to the calibration pressure value, and wherein the insertion time of the reductant injector is based on the pump insertion frequency value.

14. The method of claim 11, wherein the calibration pressure value comprises a fixed calibration pressure value.

15. The method of claim 14, wherein the predetermined calibration value comprises a single calibration flow rate value and a corresponding single calibration insertion parameter value.

16. The method of claim 14, wherein the predetermined calibration value comprises a plurality of calibration flow rate values and a corresponding plurality of the calibration insertion parameter values.

17. The method of claim 14, wherein the predetermined calibration values comprises a slope of a range of flow rate values vs a corresponding range of the calibration insertion parameter values.

18. A control circuitry for controlling a flow rate of a reductant into an aftertreatment system via a reductant injector, the control circuitry comprising:

a controller comprising a memory, a processor, and a communication interface, the controller configured to be operatively coupled to a reductant insertion assembly comprising a pump and a pressure sensor including a pressure sensor memory, the pressure sensor memory storing predetermined calibration values of the pump corresponding to delivery of a reductant by the pump through a calibration injector, the controller configured to:

receive the predetermined calibration values of the pump from the pressure sensor, determine a desired flow rate of the reductant into the selective catalytic reduction system, determine an insertion time of the reductant injector for delivering the reductant through the reductant injector based on the desired flow rate value, a pump operating parameter value of the pump, and the predetermined calibration values, and activate the reductant injector for the insertion time.

19. The control circuitry of claim 18, wherein the predetermined calibration values comprise at least one of a calibration pressure value, a calibration flow rate value, and a calibration insertion parameter value of the pump corresponding to delivery of the reductant through the calibration injector at the calibration pressure value and the calibration flow rate value.

20. The control circuitry of claim 19, wherein the calibration insertion parameter comprises at least one of a calibration insertion frequency value, a calibration speed value or a calibration stroke value of the pump.

21. The control circuitry of claim 20, wherein the pump operating parameter value comprises a pump insertion frequency value corresponding to a pump operating pressure value being equal to the calibration pressure value, and wherein the insertion time of the reductant injector is based on the pump insertion frequency value.

22. The control circuitry of claim 19, wherein the calibration pressure value comprises a fixed calibration pressure value.

* * * * *